(12) United States Patent
Nguyen et al.

(10) Patent No.: US 11,345,787 B2
(45) Date of Patent: May 31, 2022

(54) METHOD OF MANUFACTURING HIGH TEMPERATURE RESISTANT COMPOSITE MATERIALS

(71) Applicant: VIETTEL GROUP, Ha Noi (VN)

(72) Inventors: Dinh Nguyen Nguyen, Ha Noi (VN); Ky Nam Pham, Ha Noi (VN); Trong Dai Vu, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 361 days.

(21) Appl. No.: 16/665,935

(22) Filed: Oct. 28, 2019

(65) Prior Publication Data

US 2020/0131319 A1 Apr. 30, 2020

(30) Foreign Application Priority Data

Oct. 29, 2018 (VN) .............................. 1-2018-04834

(51) Int. Cl.
*C08J 3/20* (2006.01)
*C08J 5/00* (2006.01)

(52) U.S. Cl.
CPC ........... *C08J 5/005* (2013.01); *C08J 2371/10* (2013.01)

(58) Field of Classification Search
CPC .......... C08J 5/005; C08J 2371/10; C08J 3/20; C08K 3/041; C08L 61/06; C08L 97/02; C08L 97/005; C09J 161/06
USPC ......................................................... 523/300
See application file for complete search history.

(56) References Cited

U.S. PATENT DOCUMENTS

| | | | | |
|---|---|---|---|---|
| 2012/0041146 A1* | 2/2012 | Zhang | .................... | C08L 97/005 525/135 |
| 2015/0140306 A1* | 5/2015 | Endo | ....................... | B29C 70/40 428/219 |

\* cited by examiner

*Primary Examiner* — Hannah J Pak
(74) *Attorney, Agent, or Firm* — PatentTM.US

(57) ABSTRACT

Methods of manufacturing high-temperature composite materials using carbon nanotube to improve the efficiency of insulation applied to propulsion systems for aerospace equipment including 5 steps: step 1: select necessary materials and equipment, step 2: disperse MW-CNTs in the polar solution, step 3: distribute MW-CNTs evenly in the resin, step 4: eliminate residual solvents, step 5: curing phenolic resin composites.

4 Claims, 6 Drawing Sheets

METHOD OF MANUFACTURING HIGH TEMPERATURE RESISTANT COMPOSITE MATERIALS

TECHNICAL FIELD

The invention refers to the field of insulation. Specifically, the invention proposes the addition of the multiwall-carbon nanotubes (MW-CNTs) component to the composite material to improve the insulation efficiency of the propulsion system compared to the current plan of using materials.

Technical Status

Ablative composites are widely used in the aerospace industry, with a combination of these properties: low density, high thermal conductivity, good high temperature stability, low heat expansion coefficient, good thermal shock resistance and especially the ability to wear out under the influence of high temperatures within appropriate time. Phenolic is the resin composed of one or more hydroxyl groups linked to the aromatic ring, giving good heat resistance properties in addition to fire resistance and dimensional stability. For these reasons, abrasive materials with a predominant form of phenolic resin are commonly used as insulation of propulsion systems.

In fact, there are already many proposed methods of reinforcing this material. G. Zhou at the "Journal of Applied Polymer Science" proposed the method of using nanoclay in addition to phenolic resin to increase the mechanical properties as well as the thermal properties of the composite materials obtained. In another study, carbon fiber-phenolic composites reinforced with deoxygenated graphite and γ-Fe2O3 particles showed great improvements in X-ray absorption. However, current methods are used only in specific purposes and certain disadvantages still exist. However, improving the ablative properties, as well as reducing the mass of the insulation of the propulsion system is always a requirement. The invention refers to the use of carbon nanotubes (CNTs) that can help to improve these problems of existing ablative materials.

Background of the Invention

The invention propose a method of manufacturing high temperature resistant composite materials with the idea of using CNTs to improve the efficiency of the insulation layer applied to the propulsion system of aerospace equipment.

The content of the idea is to use carbon fiber-reinforced phenolic materials reinforced by MW-CNTs for manufacturing the critical position of the nozzle to increase the efficiency of the launcher engine.

The addition of CNTs will significantly increase the mechanical properties of the material. CNT has good thermal stability, CNT/phenolic composites showed the best Tg glass transition temperature compared to carbon fiber/phenolic composites (CF/phenolic) and CNT/CF/phenolic composites.

CNT has great hardness, durability and high elasticity. These are superior properties compared to some other materials. It has covalent bonds between atoms which are very stable. On the graphene plane, one atom will have links with 3 other atoms. CNT is much more sustainable than other materials, especially in a vacuum or inert atmosphere such as $N_2$ or Ar. It is very hard but also has a high elasticity, able to withstand a large impact force. Normally, CNT has elastic modulus of 1054 GPa and tensile strength of 75 GPa.

CNT has original heat resistance and thermal conductivity and these properties depend on the ambient temperature. Thermal conductivity of CNT at room temperature and high temperatures is similar to graphite and diamond. However, at low temperatures, it has a completely different state because at this temperature zone, inside CNT material, the phonon quantization effect appears. CNT has good thermal conductivity along the axis of the tube but insulates in the radial direction (between the tubes). Theoretical calculations and experimental results have shown that the thermal conductivity of CNT depends on the temperature. According to J.Hone, this dependency is almost linear. At room temperature, the thermal conductivity of MW-CNT varies from 1800 to 6000 W/mK.

In order to achieve the above-mentioned purpose, the invention proposes a method including the following steps: step 1: select necessary materials and equipment; step 2: disperse MW-CNTs in the polar solvent; step 3: disperse MW-CNTs evenly in resin; step 4: remove residual solvent; step 5: curing phenolic resin composites.

The steps mentioned above are special in that:

At step 1, it is necessary to select a high purity liquid phenolic resin material with defined density. At the same time, prepare the required equipment for the manufacturing process.

At step 2, disperse MW-CNTs in the polar solution with a specified density. The purpose of the step is to disperse MW-CNTs, enabling MW-CNTs to be able to distribute evenly in phenolic resin.

At step 3, disperse MW-CNTs evenly with appropriate methods. The polar solvent containing MW-CNTs prepared in step 2 is added to the phenolic resin at a certain ratio, and then the homogeneous solution is dispersed evenly by vacuum magnetic stirring and ultrasonic vibration. The process of vacuum magnetic stirring is better when it lasts from 3-7 hours at 60-100 rpm at a temperature of 40-50° C., then the mixture is again ultrasonic vibrated at the frequency of 20-40 kHz for 30-60 minutes.

At step 4, remove the residual solvent in the solution after step 3 by the method of evaporating from open surfaces in a vacuum furnace, at a suitable temperature for a given time.

At step 5, the curing process is the hardening process of the resin based on circuit development and cross connections under a defined pressure—temperature condition. Implementing the method as proposed in the invention allows the manufacturing of a material that not only has good thermal conductivity, but also is highly stable at very high temperatures of about 2800° C. in a vacuum and in inert gas (Ar) environments. Accordingly, this material is not only suitable for use in civil manufacturing industries, but also can be used in aviation equipment with a specific operating environment.

DETAILED DESCRIPTION OF THE INVENTION

Figure 1:
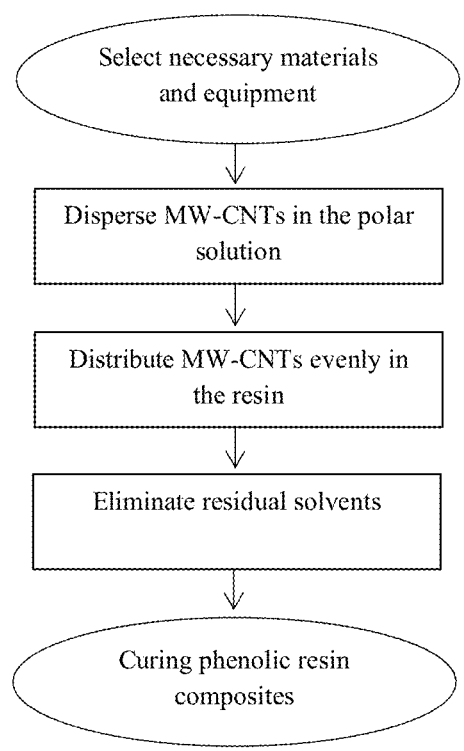
FIG. 1: Figure showing the steps taken.

According to one aspect of the invention, the method of manufacturing composite materials is proposed by using CNTs to improve the efficiency of the insulation.

Step 1: Select Necessary Materials and Equipment

Select liquid phenolic materials with high purity and specific density. It is best when the selected liquid phenolic resin material has a purity of 100% and a molecular weight of approximately 124,137.

At the same time, prepare the required equipment for the manufacturing process. At least, the following equipment is required: vacuum stirring tank, ultrasonic vibrating tank, vacuum heating chamber and autoclave.

Step 2: Dilute MW-CNTs in the Polar Solution

At this step, dilute MW-CNTs in the polar solution, whereby MWCNT is dispersed in a polar solution of 100% concentration with an appropriate equivalent mass ratio.

The dispersion of MW-CNTs is better if done in polar solvent with an equivalent mass ratio between [1:10] and [1:20], preferably 1:14.

The solution used at this step may be polar solvent such as acetone, ethanol, methanol, etc.

After dispersing MW-CNTs in this solution, a polar solution with MW-CNTs disperses is obtained, the intermediate mixture is used to further disperse MW-CNTs in phenolic resin from the next step.

Step 3: Distribute MW-CNTs Evenly in the Resin

At this step, it is possible to disperse MW-CNTs by methods such as magnetic vacuum stirring and ultrasonic vibration. The purpose is to facilitate the uniform distribution of MW-CNTs in phenolic resin solution.

According to an invention implementation plan, the dispersion of MWCNT by magnetic vacuum stirring is done as follows:

The polar solvent solution containing MWCNT prepared in step 3 is added to the phenolic resin at the appropriate rate. It provides better results if the ratio reaches [1:10].

The homogeneous solution is stirred in a magnetic vacuum and then ultrasonic vibrated.

The process of stirring in a magnetic vacuum is carried out in a vacuum vessel (the mixture is put into the flask and vacuumed to 0 mbar. The system is then placed on a magnetic induction heating stove and it is continued to perform the magnetic stirring process. The process can last from 3-7 h at 60-100 rpm at a temperature of 40-50° C.

Ultrasonic vibrations provide better results if performed at 20-40 kHz (preferably 37 kHz) for 30-60 minutes.

At the end of this step, a mixture of liquid phenolic resin and MW-CNT particles are distributed evenly.

Step 4: Remove the Residual Solvent

At this step, remove the residual solvent in the solution after step 3 by the method of evaporating from open surfaces in a vacuum furnace.

The mixture is placed in a device with a large open surface and kept in a vacuum environment at a specified temperature and time. The method gives better results when done at temperatures of 50-70° C. for 3-5 days.

Implementing the method of eliminating residual solvents at the above-mentioned temperature and time still ensures the retention of phenolic resin components, while evaporating the amount of polar solvent.

Step 5: Curing Phenolic Resin Composites

After obtaining the solvent-reducing MW-CNTs homogeneous mixture, which is of high purity, the curing process forms the shape of the material to be used.

Curing is a hardening process of plastics based on circuit development and cross-linking under defined pressure temperature conditions.

According to standard curing process for phenolic resin in autoclave, at 690 kPa, there are 3 stages:

Keep the temperature at 70° C. for 1.5 hours
Keep the temperature at 100° C. for 1 hour
Keep the temperature at 140° C. for 4 hours.

EXAMPLES

At a specific aspect, to compare the ability to increase the efficiency of the insulation, the author conducted tests on four types of materials, including:

Phenolic resin material, hereinafter called "Materials (a)".

Material (a) is added with carbon fibers (CFs) which are cut from mat material, with a length of 30 mm, a thickness of 0.27 mm—This material is applied to fabricate insulation layer by ablation mechanism according to the previous plan, and is currently being applied, hereinafter referred to as "Materials (b)".

Material (a) combined with C-fibers mat (with a size of 50×50×0.27 mm).

This material is being applied to fabricate insulation according to the ablation mechanism of the Russian propulsion system, hereinafter referred to as "Materials (c)".

Materials (c) combined with MW-CNTs, hereinafter referred to as "Materials (d)".

The authors offer a number of tests that are conducted to compare the four types of materials mentioned above:

Fire resistance test: The sample is exposed to $C_4H_{10}$ gas flame at a temperature of 1300° C. for 30 seconds according to ASTM E84-11. Observing the surface near the flame position, and determine the area of the heat-spreading zone, hereinafter referred to as "test (1)".

Thermal conductivity test: Hereinafter referred to as the "test (2)".

Ablation test: The sample is exposed to the flame of oxygen—kerosene at 2300° C. Determine the surface temperature where exposed directly to the flame and the time the sample is penetrated by the flame, hereinafter referred to as the "test (3)".

Thermal stability test: The test is for determining ablation rate according to the temperatures from 100-800° C., hereinafter referred to as the "test (4)".

Tensile test at room temperature: Hereinafter referred to as the "test (5)".

Figure 2:
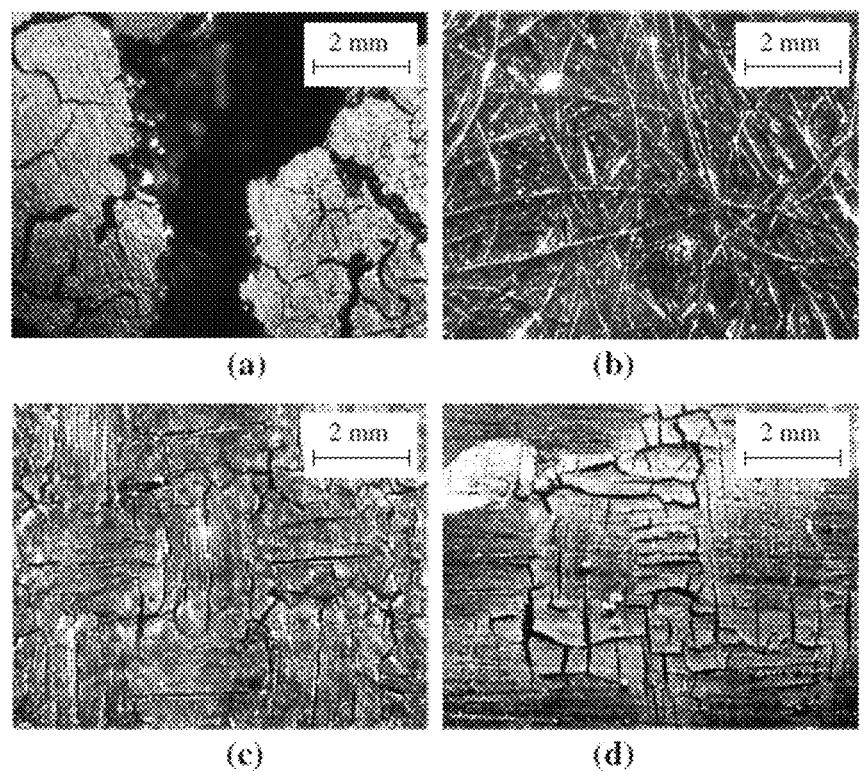
FIG. 2: Surface of the samples after fire resistance test.

The result of the test is given as follows:

Test (1): Fire Resistance Test:

Sample Surface State:

Refer to FIG. 2, at sample (c) and sample (d), cracks develop on the surface of phenolic resin, instead of causing plastic flow. Meanwhile, the structure of sample a) and b) is almost destroyed. Thus, it can be commented that the reinforced carbon content can reduce the number of cracks for phenolic resin when exposed to fire. The development of cracks can be limited by adding CNTs and evenly distributed CFs (mat).

It can be explained as follows: If the sample has low thermal conductivity, cracks easily appear due to stress concentration. However, the increased amount of C can help reduce the appearance of cracks by increasing the thermal conductivity of the material. Mat-type CFs results in better thermal conductivity than rag-type CFs, due to its evenly distributed, layered structure.

Figure 3:
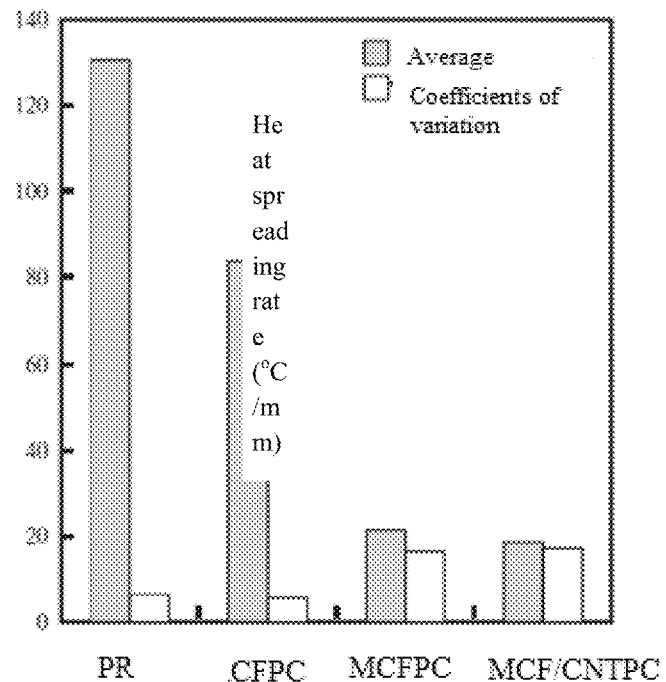
FIG. 3: Heat-spreading rate of samples.

Heat spreading ability: Refer to FIG. 3, notice that in the material (a), there is a large temperature difference between the front and back of the sample under the effect of a heat source of 1300° C. Composites with more CFs have a lower temperature difference between the two sides because the CF component has good thermal conductivity. After adding CNTs to CF/phenolic composites, the material gives the best properties. This shows that CNT has the ability to increase the thermal conductivity for phenolic matrix composites.

Figure 4:
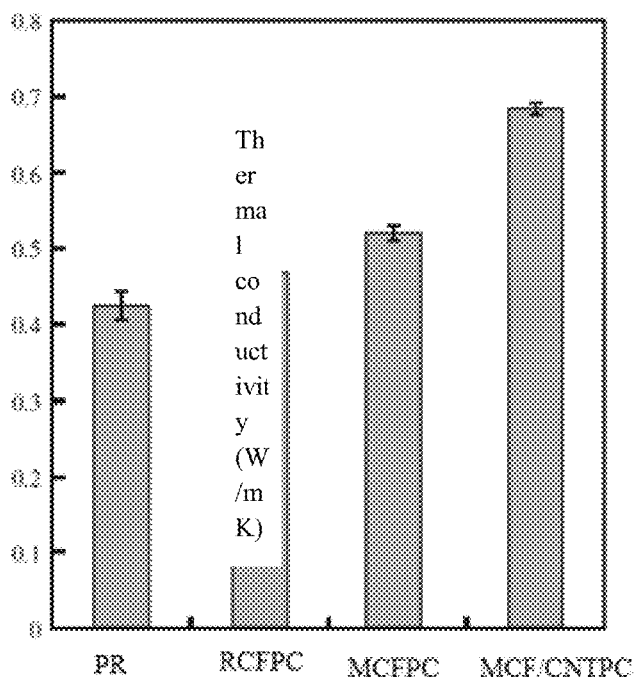
FIG. 4: Thermal conductivity of samples.

Test (2): Thermal Conductivity Test:

Refer to FIG. 4, showing that composites with reinforced C have higher thermal conductivity. In addition, the type and arrangement also affect the ability of heat absorption, dispersion and heat transfer, thus affecting thermal conductivity.

Materials (c) and (d) have a higher thermal conductivity than material (b) despite having the same CF content. The difference here is because the shredded CFs are not continuous, leaving lots of space between them.

The mat-type CFs has a more continuous structure than CFs in composite. In addition, the appearance of CNTs also caused the difference in thermal conductivity between materials (c) and (d) because CNT has a large surface area, therefore, with only a small amount of CNTs also help increase the contact area and heat conduction through the composite.

Figure 5:
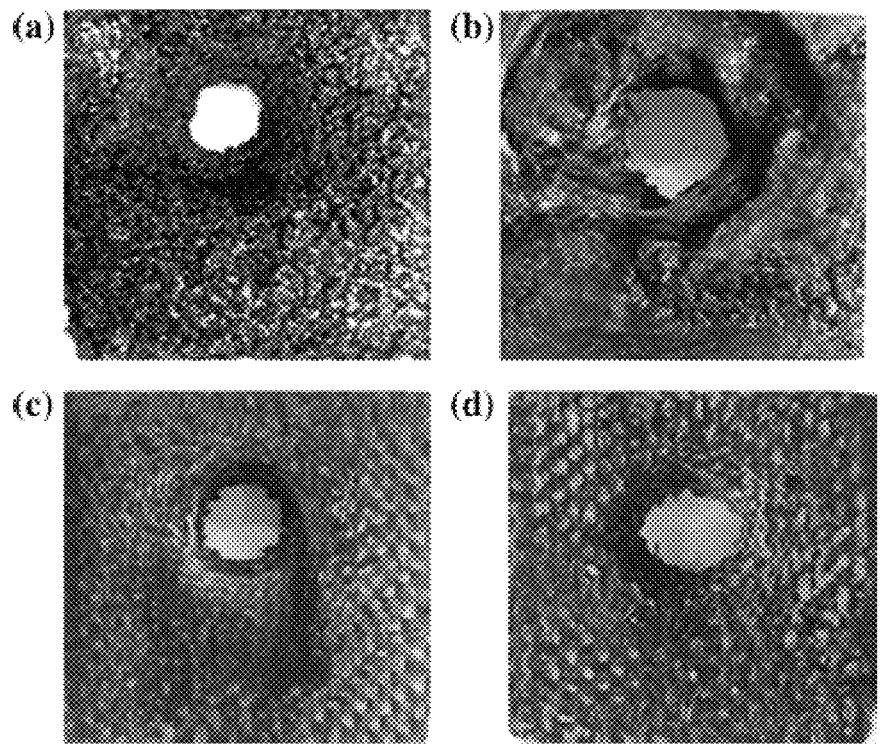
FIG. 5: Surface of samples after ablation test.
Figure 6:
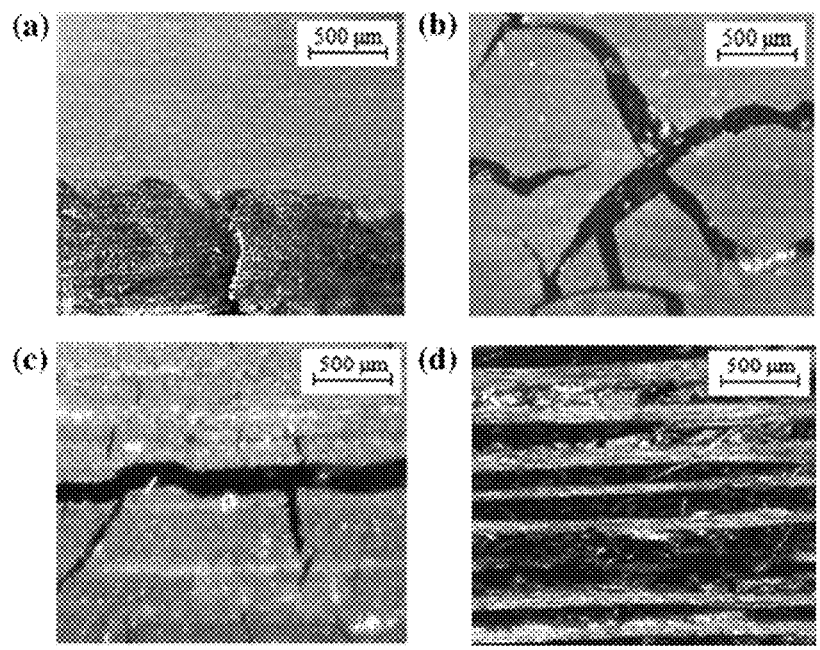
FIG. 6: Cross-sectional image (side) of samples after ablation test.

Test (3): Ablation Test:

Evaluation of ablation rate: Refer to FIGS. 5 and 6, it can be seen that material (a) has the largest ablation rate. In materials (b), (c), (d), due to the addition of component C, the rate decreases.

In material (a), thermal destruction is concentrated near the flame torch. In materials (b), (c) and (d), the heat destruction area spreads out and is easy to observe.

At sample (a), carbon black concentrated at the flame contact position in the front of the sample. However, there is a small amount on the back. At samples (b), (c), soot is available on both the front and the back of the sample. Especially with the mat-type CF sample, the amount of soot on the front and back is almost the same. It is easy to comment that the faster the combustion rate is, the less trace of oxidation is left, while the sign of oxidation can be seen in (c) and (d). The soot status on both sides of the sample shows that the material has a low ablation rate.

Figure 7:
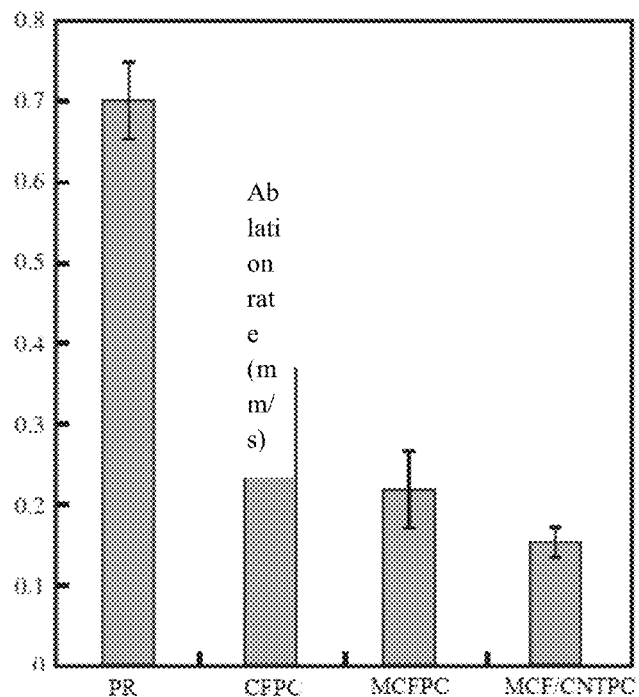
FIG. 7: Diagram determining the ablation index of materials.

Evaluation of ablation time: Refer to FIG. 7, the sample (a) is most susceptible to be destructed due to the heat concentrated in a narrower area. Samples (b), (c), (d) are more difficult to be damaged due to their higher thermal conductivity, easily transfer and diffuse heat away from flame.

Test (4): Thermal Stability Test:

Refer to FIG. 7: the results show that the addition of CFs increases the thermal stability of materials (2), (3), (4). CFs and CNTs reduce the decomposition rate of materials at high temperatures.

It is possible to identify that the addition of CFs and CNTs can reduce the ablation rate of phenolic resin composites.

Figure 8:
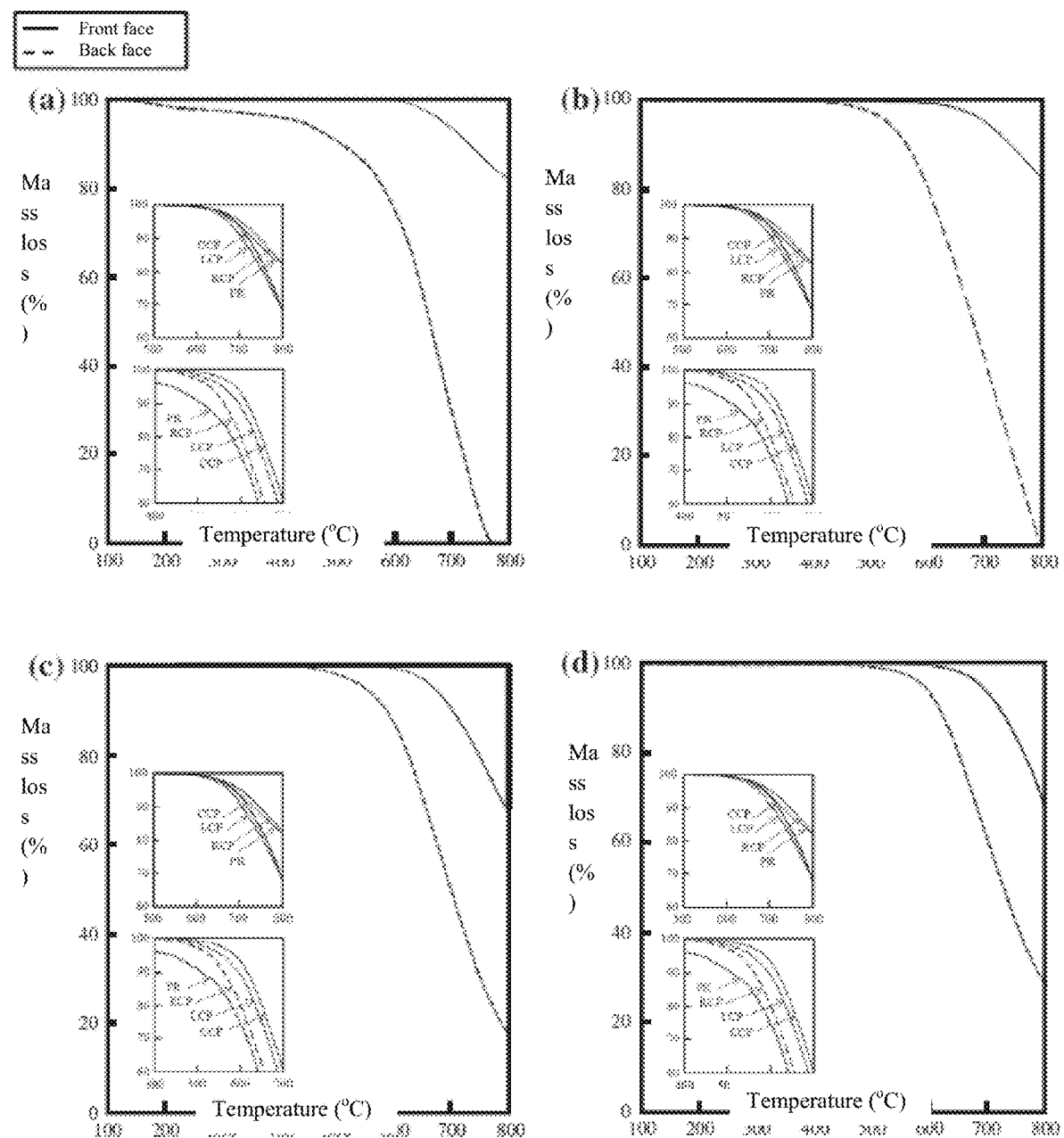
FIG. 8: Diagram determining the mass loss according to temperature (thermal stability) of materials.

Test (5): Tensile Test at Room Temperature:

FIG. 8 showing the influence of CNTs content by weight on the tensile strength of the material: the results show that the increase in MW-CNT content helped to increase the properties of the final composite.

Through the tests, it can be concluded, with a sample size of 50×50×10 mm:

Thermal conductivity: Material (a)<(b)<(c)<(d)

Thermal stability: Materials (d)>(c)>(b)>(a).

Accordingly, it was found that the increase in MWCNT content contributes to increase the properties of composites (d).

The addition of CNT content of 0.5% helps to significantly increase the properties of the ablative materials used for manufacturing the insulation of propulsion system for aerospace equipment.

The invention is described in detail by using the options described above. However, it is clear that, the invention is not limited to the plan described in the invention description. An invention may be made in moderation that is not outside the scope of the invention determined by the protection claim points. So what is described in the patent description is for illustrative purposes only, and will not impose any restrictions on the invention.

The invention claimed is:

1. A method of manufacturing heat-resistant composite material comprising:
   Step 1: providing a phenolic resin of 100% purity having a molecular weight of approximately 124,137, and equipment for manufacturing process including a vacuum stirring tank, an ultrasonic vibrating tank, a vacuum heating chamber and an autoclave;
   Step 2: dispersing MW-CNTs in a polar solvent with a concentration of 100%, the mass ratio of the polar solvent is between 1:10 and 1:20;
   Step 3: distributing MW-CNTs evenly in the phenolic resin, wherein this step is performed by using a method of magnetic stirring and ultrasonic vibration at a frequency of 20-40 kHz for 30-60 minutes;
   Step 4: eliminating residual solvents by performing a method of evaporating from open surfaces in a vacuum furnace to form a phenolic resin composite;
   Step 5: curing the phenolic resin composite in an autoclave at a pressure of 690 kPa, which consists of 3 phases:
   keep the temperature at 70° C. for 1.5 hours,
   keep the temperature at 100° C. for 1 hour, and
   keep the temperature at 140° C. for 4 hours.

2. The method of manufacturing heat-resistant composite material according to claim 1, wherein at Step 2: dispersing MW-CNTs in the polar solution, wherein the mass ratio of the polar solvent is 1:14.

3. The method of manufacturing heat-resistant composite material according to claim 1, wherein at Step 3: dispersing MW-CNTs in the phenolic resin, is as follows:
   the mass ratio of the polar solvent containing MW-CNTs prepared in Step 3 that is added to the phenolic resin is 1:10;
   the polar solvent containing MW-CNTs added to the phenolic resin is magnetic vacuum stirred for 3 to 7 hours at a speed of 60-100 rpm at a temperature of 40-50° C.; and
   the polar solvent containing MW-CNTs added to the phenolic resin is then subjected to ultrasonic vibration at 20-40 kHz for 30-60 minutes.

4. The method of manufacturing heat-resistant composite material according to claim 1, wherein at the step of eliminating residual solvents by the method of evaporating from open surfaces in the vacuum furnace, the step is performed at temperatures of 50-70° C. for 3-5 days.

* * * * *